United States Patent
Slakey

[11] 3,898,062
[45] Aug. 5, 1975

[54] BAG HOUSE AND MANIFOLD SYSTEM

[75] Inventor: Philip B. Slakey, Orinda, Calif.

[73] Assignee: Industrial Clean Air, Inc., Berkeley, Calif.

[22] Filed: Jan. 10, 1974

[21] Appl. No.: 432,589

[52] U.S. Cl. ............... 55/269; 55/96; 55/302; 55/303; 55/341
[51] Int. Cl.² ............................. B01D 46/02
[58] Field of Search ....... 55/96, 302, 303, 341, 269; 137/596.18

[56] References Cited
UNITED STATES PATENTS

| | | | |
|---|---|---|---|
| 2,470,471 | 5/1949 | Carleton | 137/594 |
| 2,741,330 | 4/1956 | Kaess | 55/302 |
| 3,057,137 | 10/1962 | Perlis et al. | 55/303 |
| 3,513,876 | 5/1970 | Tarbox | 137/596 |

FOREIGN PATENTS OR APPLICATIONS

| | | | |
|---|---|---|---|
| 1,239,745 | 7/1960 | France | 55/341 |

*Primary Examiner*—Bernard Nozick
*Attorney, Agent, or Firm*—Phillips, Moore, Weissenberger, Lempio & Strabala

[57] ABSTRACT

A duct system wherein a main dirty or clean gas manifold services spaced-apart rows of bag houses and wherein a reverse-air manifold and valved passage assembly is interposed between and is connected to the main dirty or clean gas manifold and the bag houses. The assembly has a reverse-air manifold therein and valved passages to communicate the interior of each bag house with either the main dirty or clean gas manifold for normal gas-cleaning operation or with the reverse-air manifold for bag-cleaning operations. The construction of the reverse-air manifold and valved passage assembly provides heat exchange between a hot gas being cleaned and the reverse air to avoid undesirable condensation during cleaning operations.

4 Claims, 5 Drawing Figures

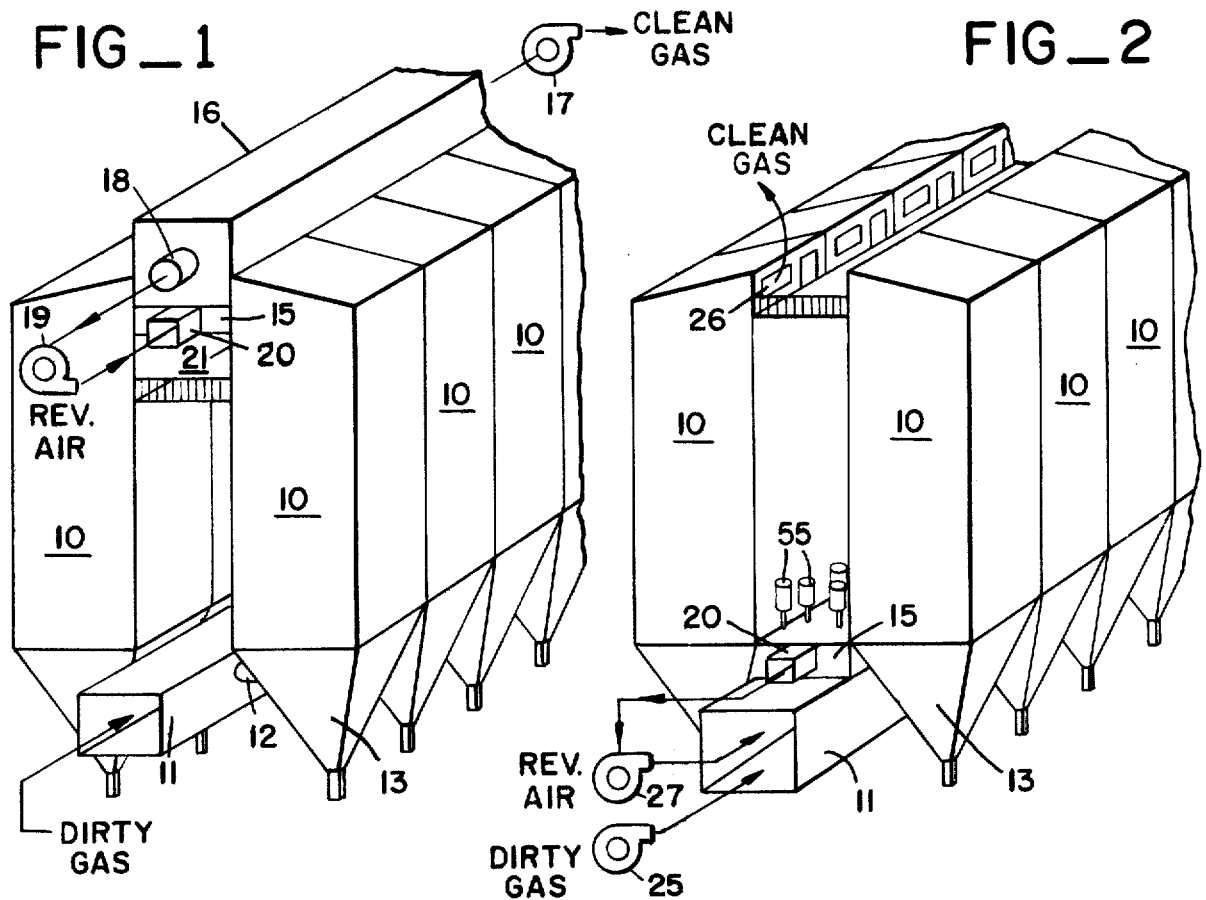
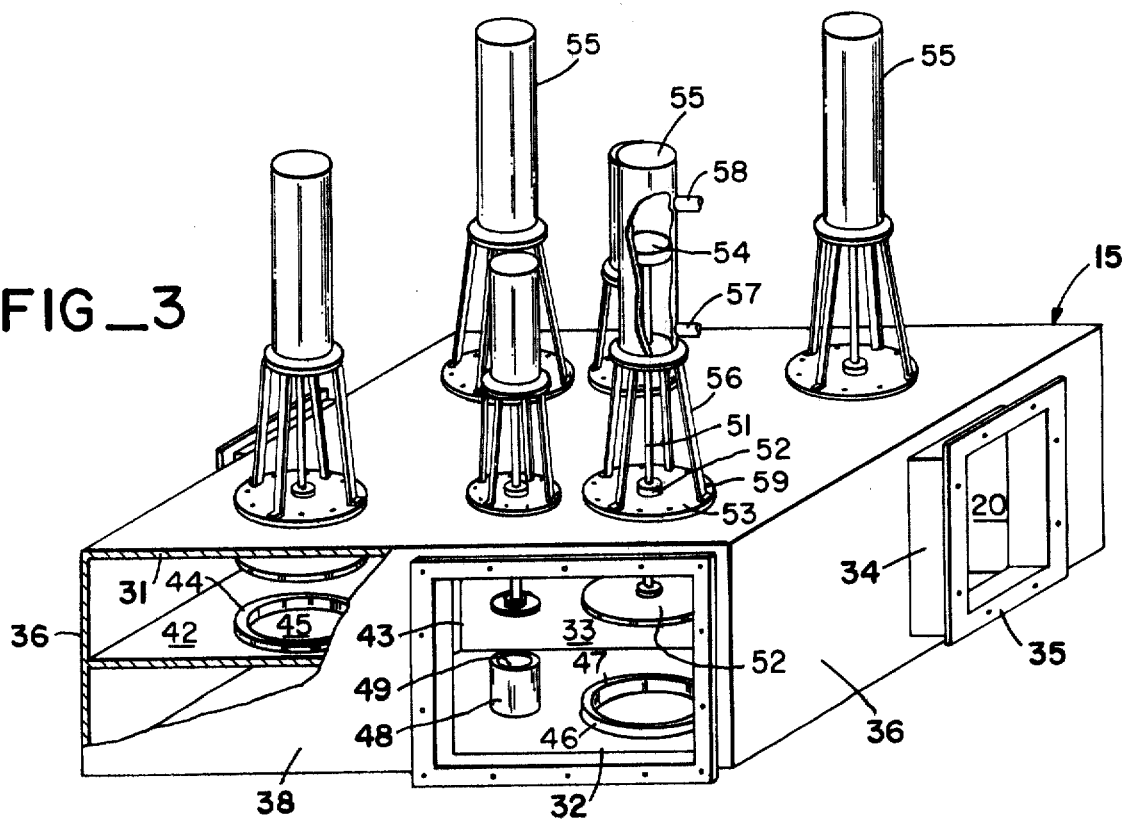

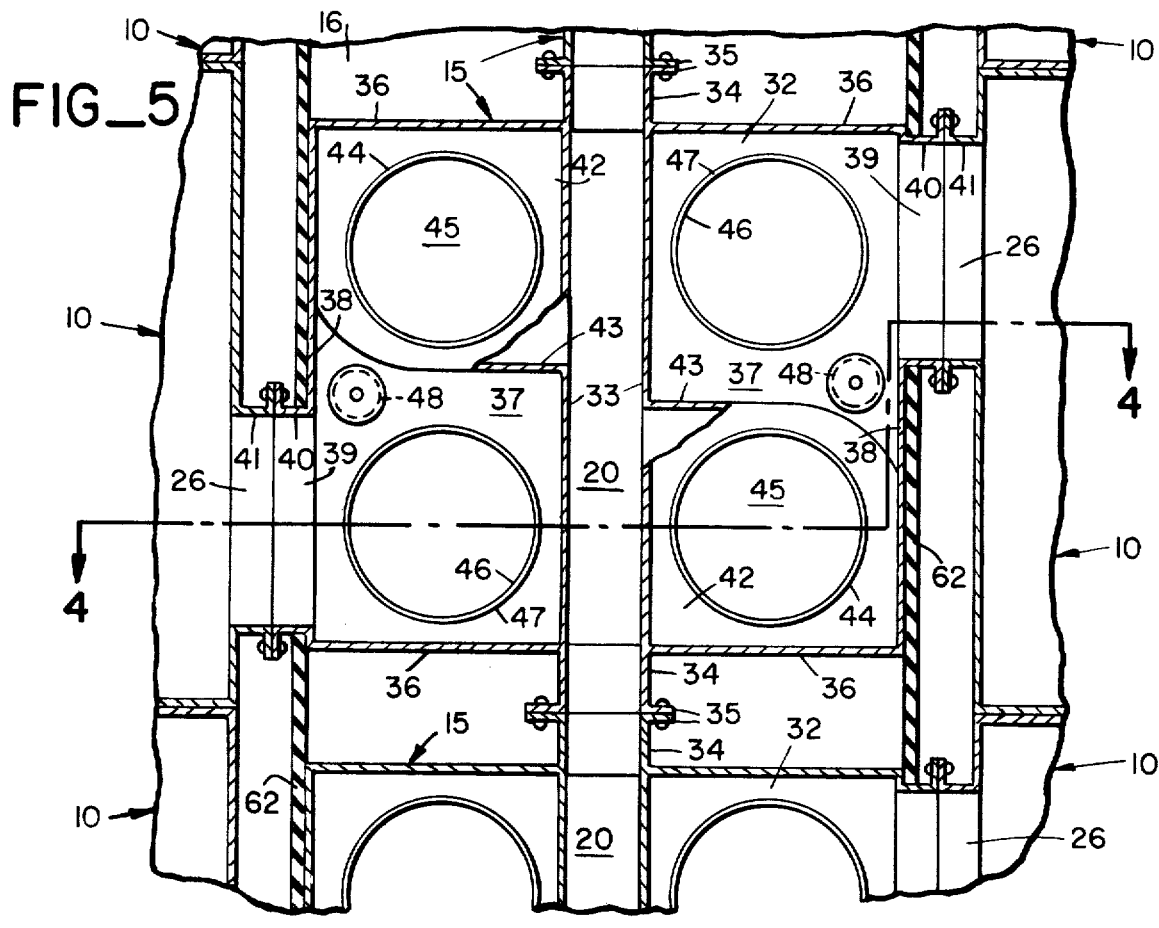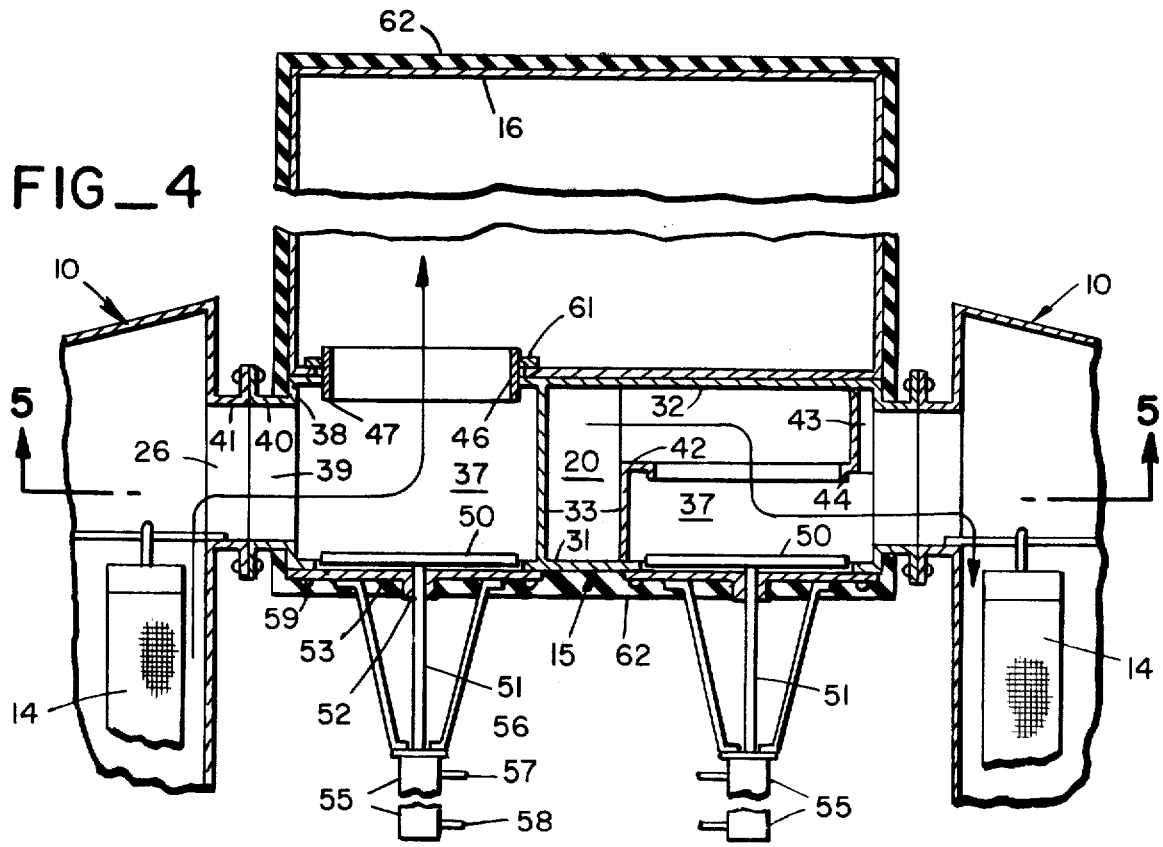

BAG HOUSE AND MANIFOLD SYSTEM

BACKGROUND OF THE INVENTION

This invention relates to industrial gas-cleaning systems of the type wherein dry dirty gas, i.e., dry gas with particulate solids entrained therein, passes into an enclosed bag house, flows through the fabric bag filters suspended in the house to remove the solids from the gas with the cleaned gas being exhausted from the bag house.

Typically, industrial bag house systems have two rows of individual bag houses. In a suction system the dirty gas from an industrial process is delivered by a common manifold to all of the bag houses. The cleaned gas discharges from the bag houses into another common manifold which connects to the inlet of a high capacity blower. The blower maintains a low pressure in the system to induce the desired flow of the gas therethrough, and the clean gas discharges from the blower outlet either to atmosphere or to some further operation.

In a pressure system, the dirty gas passes through a blower and is forced through a common manifold into each bag house. The cleaned gas then discharges from the house, usually to atmosphere.

In either system, dust or other particulate matter will accumulate on the bag filters as the cleaning process continues, gradually reducing the filter efficiency. Periodically, normal flow of dirty gas through the house is interrupted and clean gas is forced into the bag house to flow in a reverse direction through the filter bags to dislodge the accumulated dust. The gas used for the bag-cleaning operation is usually referred to as "reverse air" even though such gas may not be atmospheric air. After the bags are thus cleaned, the flow of reverse air is discontinued and the bag house is put back on stream.

In a multiple bag house installation, continuous operation of the gas-cleaning system is maintained by cleaning the houses one by one while the dirty gas flows through the remaining houses. As a consequence a separate manifold system must be provided to supply reverse air individually to the bag houses. Valving arrangements must be provided to isolate each bag house from the dirty gas flow system and to connect them to the reverse air duct. Timer-operated automatic control systems are provided to operate the various valves so that the bag houses are cleaned in the desired sequence.

Industrial gas-cleaning units are often of very large size and expensive to install. For example, a multiple bag house system may have two rows of ten bag houses, with an overall length of 100 feet, each bag house having a hundred 30-foot-high filter bags suspended therein. The dirty-gas and clean-gas manifolds for such a system may each have a cross-sectional flow area of about 50 square feet. The connections from the bag house to the manifolds and the valves therein may be several feet in diameter.

Because of the size and weight involved, much of the manifold and ducting system must be fabricated at the site, particularly the valved distribution systems which connect the individual bag houses to the dirty-gas, clean-gas and reverse-air manifolds. The separate reverse-air manifold system must be connected to the bag houses in the same general location as the clean-gas or dirty-gas manifold systems are connected thereto, depending on whether a suction or pressure system is involved. In either case, having to provide two separate manifold systems in essentially the same location usually requires a complicated and expensive design in order to fit all the ducting in without sacrificing flow efficiency. The problem is even more acute in a pressure system since the reverse-air manifold system must be fitted into a space already filled with structural supports and the system which removes accumulated dust from the bag house hoppers.

As mentioned previously, valves must be provided to connect the bag houses to the various ducts for normal gas-cleaning or for bag-cleaning. Oftentimes, because of the complexity of the manifold and ducting systems and the large size of the component parts, the valves for a single bag house must be located at physically separated points such that it is difficult or impossible for a single workman to inspect all valves associated with a single bag house at the same time and see that they are operating in the proper sequence.

In instances where the gases to be cleaned are hot combustion products from the burning of coal having a high sulphur content, the system must be designed to maintain the temperature in the gas flow system and the bag houses sufficiently high at all times to prevent condensation and formation of sulphuric acid in the system. In particular, the reverse air must be heated so that when it is injected into a bag house it will not cool the gas therein and cause undesired condensation. The same consideration is involved whenever the gases to be cleaned are hot mixtures of air and water vapor. The reverse air must be above the dew point to prevent undesired condensation.

For hot gas operation in suction houses the source for reverse air is typically the clean-gas manifold from the bag houses since the clean gas therein will already be at elevated temperature. The reverse air taken from the clean-gas manifold passes through a blower and is blown through the reverse-air manifold system back into the bag houses. To prevent heat loss, the reverse-air manifold system is usually insulated. If this is not enough to maintain the reverse air at the desired high temperature, an additional heater must be provided for the reverse-air system.

Since the clean-gas manifold must be insulated to prevent condensation therein, the typical hot-gas-cleaning system thus requires separate, and costly, insulation of both the clean-gas and reverse-air duct systems and perhaps an additional heater for the reverse-air system.

SUMMARY OF THE INVENTION

It is the primary object of the invention to provide a manifold system for bag house operations which is more compact, less costly to construct and install, more efficient in operation and easier to inspect and maintain than the corresponding systems now in use.

In particular, the object is achieved by providing a plurality of prefabricated modules each of which is to be connected to a pair of opposed bag houses, to the main gas manifold servicing that end of the bag houses, and end-to-end with the other modules. Each module incorporates therein a section of the reverse-air manifold and valved passages to connect the bag houses to either the main gas manifold or the reverse-air manifold. Combining the reverse-air manifold sections and valved passages into one compact passage greatly reduces the amount of field work necessary to install the system and also enables the hot gases passing from the bag houses to heat the reverse air.

Other objects and advantages will become apparent in the course of the following detailed description.

BRIEF DESCRIPTION OF THE DRAWINGS

In the drawings forming a part of this application, and in which like parts are designated by like reference numerals throughout the same, FIG. 1 is a perspective and partially schematic view of a multiple bag house installation wherein gas flow through the bag houses is induced by suction;

FIG. 2 is a similar view of a multiple bag house installation wherein gas flow through the bag houses is caused by blowing the dirty gas therethrough;

FIG. 3 is a perspective view of a reverse-air manifold and valved passage module;

FIG. 4 is a sectional view, in elevation, taken on line 4—4 of FIG. 5, of a bag house installation of the type shown in FIG. 1, showing the modules and their connections to each other and to the bag houses and the clean-gas manifold;

FIG. 5 is a horizontal sectional view, looking up, of the structure shown in FIG. 4 and taken on line 5–5 thereof. DESCRIPTION OF THE PREFERRED EMBODIMENT Referring now to the drawings, FIG. 1 illustrates an installation having two spaced-apart rows of vertically oriented bag houses 10. Dirty gas from an industrial operation flows through the dirty-gas manifold 11 and through ducts 12 into the hoppers 13 of each bag house. The bag houses are of conventional internal construction and are not described herein. Suffice it to say that the dirty gas flows up into the fabric bags 14 (FIG. 4) and through the fabric to be cleaned thereby. The bulk of the particulate matter in the dirty gas falls into the hoppers 13 and is removed therefrom by a dust-removal system (not shown). Some of the particulate matter lodges upon the surface of the filter bags or in the interstices of the fabric. The cleaned gas then flows from the upper end of the bag houses into the end-to-end line of reverse-air manifold and valved passage modules 15 and then into the clean-gas manifold 16. The suction side of discharge blower 17 is connected to the clean-gas manifold 16 to create a subatmospheric pressure in the manifold to draw gas through the described system. Duct 18 delivers clean gas from clean-gas manifold 16 to blower 19 which forces the clean gas under pressure into the reverse-air duct 20. A platform 21 is provided for workmen so that they may inspect and service the upper parts of the installation.

FIG. 2 illustrates a pressure-type installation wherein blower 25 forces dirty gas into the dirty-gas manifold 11. The dirty gas flows from duct 11 through the end-to-end line of reverse-air manifold and valved passage modules 15 into the hoppers of the rows of bag houses 10. The dirty gas is cleaned by the fabric bags in the bag house and the clean gas discharges through the ports 26 in the upper end of the bag houses. Reverse air flow is created by blower 27 which has its suction side connected to the reverse-air duct 20. When a bag house is connected to the reverse-air duct, the blower 27 will suck clean air into the top of the bag house through port 26 and cause such air to flow in a reverse direction through the fabric bags. Blower 27 then discharges the reverse air and dust entrained therein into the dirty-gas duct 11 for delivery to the other bag houses.

FIGS. 3, 4 and 5 illustrate the details of the reverse-air manifold and valved passage module 15 and the manner in which they cooperate with the bag houses 10 and the clean-air manifold 16. FIG. 3 shows the module 15 in an orientation for installation in a FIG. 2 system. The module 15 is inverted when installed in a FIG. system, i.e., as illustrated in FIGS. 4 and 5.

Module 15 is generally rectangular in cross section throughout its length and has spaced-apart horizontal plates 31 and 32, forming the top and bottom of the module, and spaced-apart partitions 33 extending between plates 31 and 32 and along the length thereof to form a section of the reverse-air manifold 20 therebetween centrally of the module. Sleeves 34 at both ends of the unit 15 extend the reverse-air manifold section, the sleeves being provided with flanges 35 for connection to the next module. Spaced-apart end walls 36 extend between plates 31 and 32 and outwardly from partition 33 and transversely of the module to form valve chambers 37 within the module, one on each side of the reverse-air manifold. The outer sides of the valve chambers are closed by side walls 38, the latter having a port 39 therethrough and a flanged sleeve 40 for connection to the flanged sleeves 41 on bag houses 10 so that the module and bag house ports 39 and 26 can be brought into communication.

Each valve chamber 37 has a reverse-air passage formed thereinto by horizontal and vertical partitions 42 and 43, the passage being open through wall 33 to the reverse-air manifold 20. Partition 42 has an annular valve seat 44 formed thereon surrounding the opening 45 through the partition into the valve chamber 37.

Each valve chamber is adapted to be fluidly communicated with the clean-gas manifold 16 by means of a sleeve 46 which is fixed to plate 32 and extends through an opening therethrough and through a registering opening in the clean-gas manifold. The end of sleeve 46 within valve chamber 37 forms an annular valve seat 47.

For purposes to be hereinafter described, each valve chamber is also adapted to be fluidly communicated with the clean-gas manifold 16 by a second passage of smaller diameter, this passage being formed by sleeve 48 fixed to and extending through plate 32 and having a valve seat 49 formed on the end of the sleeve.

All of the valve seats 44, 47 and 49 lie in parallel planes and all face module plate 31.

A valve and valve operator assembly is provided for each of the aforementioned valve seats. Each assembly includes a flat circular valve plate 50 mounted on a piston rod 51 which extends through a packing gland 52 on mounting plate 53 to the piston 54 in cylinder 55. Support legs 56 fixed to mounting plate 53 position the cylinders 55 away from the support plate so that movement and the position of the piston rod may be observed by a workman. Fluid lines 57 and 58 extend from both ends of the cylinder through a suitable control means (not shown) to a source of fluid under pressure (not shown). Mounting plates 53 are removably secured to module plate 31 by bolts 59, so that the entire valve and valve operator assembly can be installed or removed as a unit. Each valve and valve operator assembly is of the same design, but the valve diameter and length of piston stroke will vary as necessary.

In practice, the modules 15 will be constructed in a machine shop for later transport to the construction site. The size of these units will, of course, depend upon the design of the complete installation, but dimensions of ten feet in length and width and two feet in depth is not atypical. For such size the main valves and valve seats may be 42 and 40 inches respectively. Construction of these modules in the shop will result in substantial economies as compared to field construction and also enables the valves to be easily shop-tested and adjusted.

If desired, the modules may be delivered to the site with the valve and valve operator units installed thereon, or else the valve and valve operator units may be delivered separately for later installation.

At the job site, the bag houses will already have been installed. Each module is then positioned between a pair of opposite bag houses and connected thereto. After that the modules are connected end to end to form the reverse-air manifold duct completely through the length of the module assembly. Next, prefabricated sections of the clean-gas manifold 16, typically 30 feet in length per section, are assembled and connected to the end-to-end module assembly 15. To facilitate assembly, and compensate for misalignment, the main gas manifold can have oversized holes preformed therethrough for reception of the sleeves 46, FIG. 4, with ring 61 being then welded to sleeves 46 and the main duct to seal the units together.

If it is desired to provide insulation, a layer of insulating material 62 is placed around the main gas manifold and the end-to-end modules 15 which are associated therewith. As is apparent from FIG. 4, only slightly more insulation is required than would be necessary for the main gas manifold alone.

In operation of the system shown in FIG. 1, dirty gas is delivered simultaneously to all of the bag houses in which gas-cleaning operations are being carried on, i.e., to the left-hand bag house illustrated in FIG. 4. At this time the valve 50 has been moved away from valve seat 47 so that the passage to the clean-gas manifold 16 is unobstructed, allowing the clean gas passing through the filter bags 14 to flow freely to the clean-gas manifold 16.

From time to time it is necessary to clean the filter bags in a particular bag house. The automatic valve control apparatus will cause the valve 50 to seat on valve seat 47 and will then move the reverse-air valve 50 away from valve seat 44, i.e., to a position as shown on the right in FIG. 4. Clean reverse air from duct 20 can now flow into the bag house and pass in a reverse direction through the filter bags 14 to dislodge the dust particles therefrom. The reverse air and dust particles now entrained therein now pass back into the dirty-gas manifold 11 for delivery to and cleaning by the other bag houses which remain on stream.

In the bag-cleaning operations the bags will be partially collapsed by the flow of the reverse air. To prevent an abrupt and potentially damaging reopening of the bags when placed back on stream, the valve control system will first close the reverse-air valve 50 against valve seat 44 and then open the reinflate valve 50 by moving it from its valve seat 48. This allows a restricted flow of gas through the filter tubes and to the clean-gas duct 16 so that the filter tubes are gently reinflated. The timing mechanism then opens the main valve to the clean-gas duct for full on-line operation.

As will be noted, the central partitions 33 forming the reverse-air manifold 20 are exposed to the flow of clean gas passing from the bag houses to the clean-gas duct 16. As a consequence, heat from the gas coming from all of the on-line bag houses will be transmitted through the partitions 33 to heat the reverse air flowing through the reverse-air manifold so that the reverse air will be at approximately the same temperature as the clean gas to avoid condensation when the reverse air is injected into a bag house. In addition, since there is no insulation between the clean-gas manifold and reverse-air manifold, the reverse-air manifold will be heated by the clean-gas manifold, either by conduction or radiation depending on whether the manifolds abut each other as shown in the drawings or are spaced somewhat apart.

The operation of the FIG. 2 pressure system is essentially the same. In normal operation, the valves connecting the main dirty-gas manifold to the bag houses are open and the reverse-air valves are closed. When it is time to clean the filter bags, the main valves are closed and the reverse-air valves are opened. Clean atmospheric air is sucked through the bags to clean them, the reverse air and particles entrained therein being then forced by blower 27 back into the dirty-gas manifold 11 for delivery to the other bag houses. After bag-cleaning, the reverse-air valve is closed, the reinflate valve is opened to reinflate the bags and then the main valve is opened to put the bag house fully back on stream.

In either type installation, all of the valve operators are grouped together, enabling a single workman to walk down the line of modules and view at one time all three valve operators for each single bag house and watch the piston rod movement to see that the valves are indeed opening and closing and doing so in the correct sequence.

Having thus described my invention, I claim:

1. An air flow system for bag houses comprising:
   a. two spaced-apart rows of vertically oriented bag houses, each having an inlet port at the lower end thereof, an outlet port at the upper end thereof and bag filter means therein whereby dirty gas may enter the inlet port, pass through the bag filter means and exit through the outlet port,
   b. a main gas manifold extending along the length of and between said rows of bag houses,
   c. a reverse-air manifold and valved passage assembly extending along the length of and between said rows of bag houses and adjacent to said main gas manifold, said reverse-air manifold and valved passage assembly being separate from said bag houses and main gas manifold and comprising a plurality of individual enclosed modules disposed in end-to-end relationship each module having spaced-apart horizontal plates one of which is adjacent said main gas manifold, spaced-apart vertical side plates each of which is in proximate relationship to a bag house, and spaced-apart vertical end plates, each module having a pair of spaced-apart vertical partitions extending the length of said module to form a portion of the reverse-air manifold centrally of said module and bounded by said plates and partitions, said module having a valve chamber on each side of said reverse-air manifold portion, each valve chamber being bounded by one of said partitions, one of said side plates and one of said end plates, means joining said modules together in endto-end relationship and providing communication between the reverse-air manifold portions throughout the length of said assembly, there being a module for each pair of opposed bag houses, d. means forming a gas flow passage within each module from the reverse-air manifold portion thereof into each valve chamber on either side thereof, each such gas flow passage terminating in an annular valve seat opening into said valve chamber and facing the other of said horizontal plates of said module, e. means joining said modules to said main gas manifold and forming a gas flow passage from said main gas manifold into each valve chamber of each module, each such gas flow passage terminating in an annular valve seat opening into the valve chamber and facing said other of said horizontal plates of said module, f. means joining said modules to said bag houses and forming a gas flow passage from each bag house through the side wall of the module proximate thereto to communicate a port of said bag house with the interior of a valve chamber, g. each module having a plurality of valve plates therewithin, one for each annular valve seat, and a plurality of valve operators, one for each valve plate, said valve operators being mounted on said other of said horizontal plates exteriorly of said module, each said valve operator including an actuating rod connected to a valve plate and extending through said other of said horizontal plates.

2. An air flow system for bag houses as set forth in claim 1, wherein said modules are connected to said bag houses with said valve chambers being in communication with the upper outlet ports of said bag houses, and further including:

h. blower means for providing a suction on said main gas manifold, i. means for delivering dirty gas to the inlet ports of said bag houses, j. means for delivering gas under pressure to said reverse-air manifold.

3. An air flow system for bag houses as set forth in claim 1, wherein said modules are connected to said bag houses with said valve chambers being in communication with the lower inlet ports of said bag houses, wherein dirty gas under pressure is delivered to said main gas manifold and further including means to exhaust gas from said reverse-air manifold and deliver such gas to said main gas manifold.

4. An air flow system as set forth in claim 1 and further including:

k. means forming a second and smaller passage from said main gas manifold into each valve chamber of each module, each such second passage terminating in an annular valve seat opening into the valve chamber and facing said other of said horizontal plates of said module, l. each module having a plurality of valve plates, one for each such second passage, and a plurality of valve operators, one for each such valve plate, said valve operators, being mounted on said other of said horizontal plates exteriorly of said module, each said valve operator including an actuating rod connected to a valve plate and extending through said other of said horizontal plates.

* * * * *